United States Patent [19]

Zilberman et al.

[11] Patent Number: 5,163,876
[45] Date of Patent: Nov. 17, 1992

[54] METHOD OF CONSTRUCTING A COMPOSITE FLEXIBLE COUPLING ELEMENT

[75] Inventors: Jossef Zilberman, Randallstown; Daniel W. Burgess, Sykesville; Richard A. Kuchera, Finksburg; Robert E. Munyon, Columbia, all of Md.

[73] Assignee: Kop-Flex, Inc., Baltimore, Md.

[21] Appl. No.: 559,930

[22] Filed: Jul. 30, 1990

[51] Int. Cl.⁵ ............................................. F16D 3/62
[52] U.S. Cl. ........................................ 464/69; 464/93
[58] Field of Search ................... 464/69, 93, 92, 87, 464/98, 99

[56] References Cited

U.S. PATENT DOCUMENTS

| | | | |
|---|---|---|---|
| 1,316,903 | 9/1919 | Kuentzel | 464/85 X |
| 1,424,051 | 7/1922 | Wayne | 464/69 X |
| 1,483,561 | 2/1924 | Ungar | 464/69 |
| 2,073,852 | 3/1937 | Radford | 464/85 X |
| 3,668,891 | 6/1972 | Brizzolesi | 464/69 |
| 4,182,139 | 1/1980 | Hornig et al. | 464/69 X |
| 4,460,345 | 7/1984 | Chivari | 464/69 |
| 4,768,992 | 9/1988 | Mancuso et al. | 464/69 |
| 4,873,889 | 10/1989 | Ditlinger | 464/69 X |

FOREIGN PATENT DOCUMENTS

| | | | |
|---|---|---|---|
| 187354 | 10/1956 | Austria | 464/69 |
| 0530946 | 12/1957 | Italy | 464/93 |
| 0057923 | 3/1988 | Japan | 464/69 |
| 0321999 | 11/1929 | United Kingdom | 464/93 |
| 0707524 | 4/1954 | United Kingdom | 464/93 |

Primary Examiner—Daniel P. Stodola
Assistant Examiner—Tony A. Gayoso
Attorney, Agent, or Firm—Cushman, Darby & Cushman

[57] ABSTRACT

A flexible coupling element used in a flexible coupling for interfacing a drive shaft and a driven shaft and for transmitting torque therebetween while accommodating angular misalignment; the flexible coupling may be offset-link type or single disc type, both types incorporating a composite fiber wound around drive-bushings and driven-bushings in a winding pattern; the flexible coupling element being formed by compression and heat cured so that the runs connecting each bushing taper to a point midway between adjacent bushings.

5 Claims, 4 Drawing Sheets

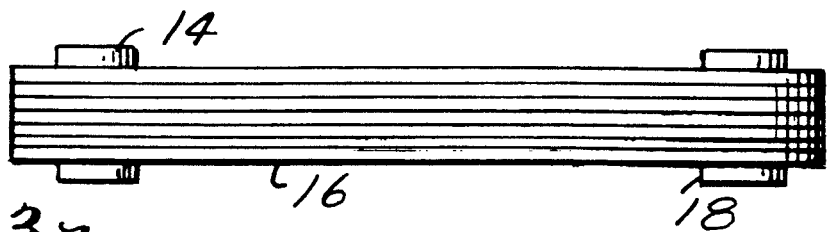
Fig. 3a.
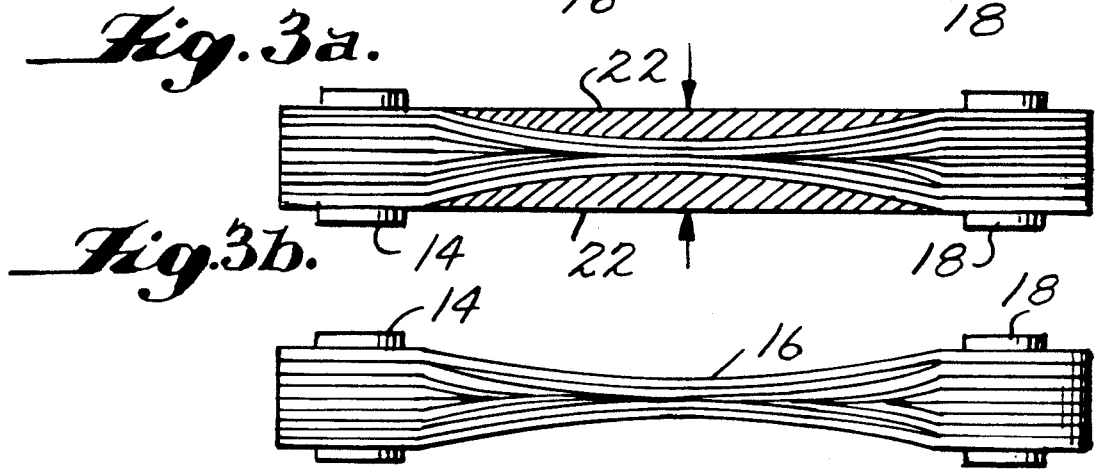
Fig. 3b.
Fig. 3c.
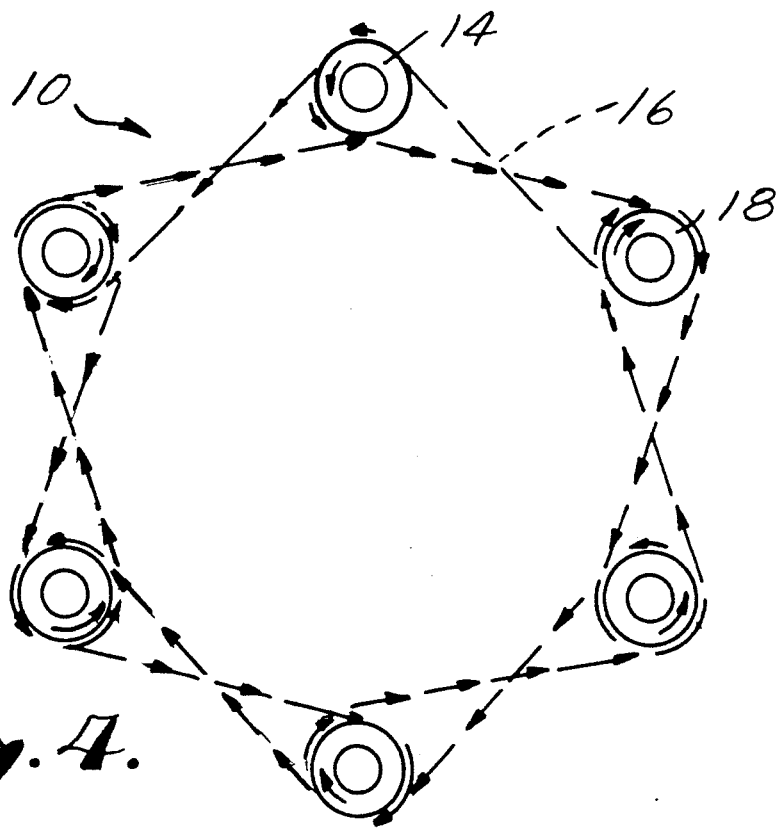
Fig. 4.

METHOD OF CONSTRUCTING A COMPOSITE FLEXIBLE COUPLING ELEMENT

BACKGROUND OF THE INVENTION

1. Field of the Invention

The present invention relates to a flexible coupling for transmitting torque between a drive shaft and a driven shaft and for accommodating angular misalignment of the shafts. More particularly, the invention relates to a flexible element manufactured from composite fibers wound and formed into a disc-type or an offset-link configuration.

2. Description of the Prior Art

Flexible couplings for connecting a drive shaft to a driven shaft, which accommodate angular misalignment between the rotating shafts, are well known in the art. Recent advancements in the art endeavor to improve the misalignment-handling capability of couplings, while maintaining the required strength of the coupling. They also attempt to minimize the weight of the coupling. Many advances have been directed toward the flexible elements used in flexible couplings. These elements are pliant enough to accommodate angular misalignment of the shafts, and they are strong enough to transfer the required torque between the shafts, although not all the links always participate in the torque transmission.

For example, consider the known configuration of composite flexible elements pictured in FIGS. 5a–5c. The pins marked with a 'D' are attached to the driving flange and those marked with a 'd' are attached to the driven flange. When torque is applied to the system shown in FIG. 5a, only three of the six links of the system are subjected to the tensile forces labelled 'T'. The links that are subjected to the force 'T' are often called driving links. The other three links are commonly referred to as the driven links.

Even though only three links contribute to torque transmission, the flexible element is usually made of six links due to the possibility that the drive shaft may rotate in a clockwise or counterclockwise direction. The six link configuration is also a more practical construction for the case of unitized flexible elements.

As shown in FIG. 5b, the links are arranged in an offset pattern having a total thickness of $2h$. Two techniques have been used to achieve such a layout. First, the individual links are separately manufactured and the driving/driven pins are then inserted through the ends of the superposed links. Second, the pins are first inserted on the bolt circle BC diameter shown in FIG. 5a. The lower links 'L' are filament wound first and the upper links 'U' second.

The links that are used to form the flexible element are of the type shown in FIG. 5c. Due to this filament winding pattern, the links can withstand only tensile forces, not compressive forces. For this reason, the system has been designed, as described above, so that only three of the links are subjected to the tensile forces.

It is interesting to note that the drive/driven shaft are restricted in their diameter due to the amount of space occupied by the conventional flexible member. It is desirable to use as large a shaft as the flexible elements will allow.

Coupling elements fall within two basic categories, the first being offset-link elements. These elements generally comprise a number links connected end-to-end in an offset manner. Each link includes a drive-bushing which receives a pin extending from a flange at one end of a drive-shaft. and a driven-bushing which receives a pin extending from a flange at an opposing end of a driven-shaft. The drive-bushings and driven-bushings are connected to form links, and the links are joined end-to-end in a loop to form the flexible element. The second category includes disc-type flexible elements. These elements generally comprise alternate drive-bushings and driven bushings concentrically arranged within a unitary composite disc.

Prior art flexible coupling elements are limited as to durability, angular misalignment capacity, or both. Originally, both categories of coupling elements comprised thin metal discs or links. The metal was strong enough to withstand the torsional forces, but was not resilient enough to withstand a large angular displacement of the drive shafts. The metal was also relatively heavy, and imposed a considerable load on the drive shaft. As the art progressed, composite elements were developed which enabled the construction of lightweight flexible couplings. These composite elements were also able to withstand a larger misalignment of the shafts. Unfortunately, the torsional strength of the composite elements was less than metal. Current devices attempt to achieve greater angular misalignment capacity and lighter weight without sacrificing the torsional strength and durability of the metal discs. These devices arrange a composite material in a selected high pattern to improve the durability of the coupling. The flexible elements are formed from composite strands repeatedly wound around adjoining drive and driven-bushings. In this connection reference may be had to U.S. Pat. No. 4,377,386. However, in this and other cases the winding pattern results in a flexible element with a small inside diameter. In such an arrangement, a coupling hub inserted through the flexible element must have a smaller bore than with other conventional couplings.

SUMMARY OF THE INVENTION

Accordingly, it is an object of the present invention to provide a lightweight flexible coupling element arranged in a disc or offset-link type configuration.

It is another object of the invention to accommodate a greater angular misalignment of the shafts without compromising the strength of the coupling.

It is another object of the present invention to accomplish the forgoing objects with an improved winding pattern and forming process.

It is still another object of the present invention to provide an improved winding pattern with a larger inner diameter to accommodate a coupling hub with a larger bore capacity.

In a preferred embodiment, the present invention comprises a flexible coupling for connecting two rotatable flanges including a drive-shaft and a driven-shaft, and for transmitting torque therebetween, each of said flanges having a plurality of pins extending outward parallel to the axis of rotation, the coupling including drive-bushings adapted to receive the driving flange pins, and driven-bushings adapted to receive the driven-flange pins, and flexible connecting means for connecting said drive-bushings with said driven-bushings, the connecting means further comprising a composite fiber wound-around said drive-bushings and said driven-bushings in a selected winding pattern, the winding pattern being defined by paired transverse wrappings connecting both of said bushings. The flexible coupling may be of an offset-link type, in which multiple flexible links are joined end-to-end to form a loop. The flexible coupling may also be of a disc-type, in which multiple concentric drive-bushings and driven-bushings are connected by a continuous composite fiber in forming a flexible-disc.

The present invention also comprises a method for improving the durability of a flexible coupling in forming the flexible connecting means by compressing the fibers connecting said bushings so that the flexible fiber bundle to reduce gradually the cross-sectional area of the bundle so that the bundle tapers axially midway between said bushings, and curing the flexible connecting means at a temperature of around 250°–350° F. for a predetermined period of time.

The foregoing and other advantages will become apparent as consideration is given to the following detailed description taken in conjunction with the accompanying drawings, in which:

BRIEF DESCRIPTION OF THE DRAWINGS

FIGS. 3a-c illustrate a sequence of steps used in forming one link of a flexible element according to one embodiment of the present invention;

FIG. 4 illustrates a winding pattern according to the present invention;

DETAILED DESCRIPTION OF THE PRESENTLY PREFERRED EXEMPLARY EMBODIMENT

Figure 1:
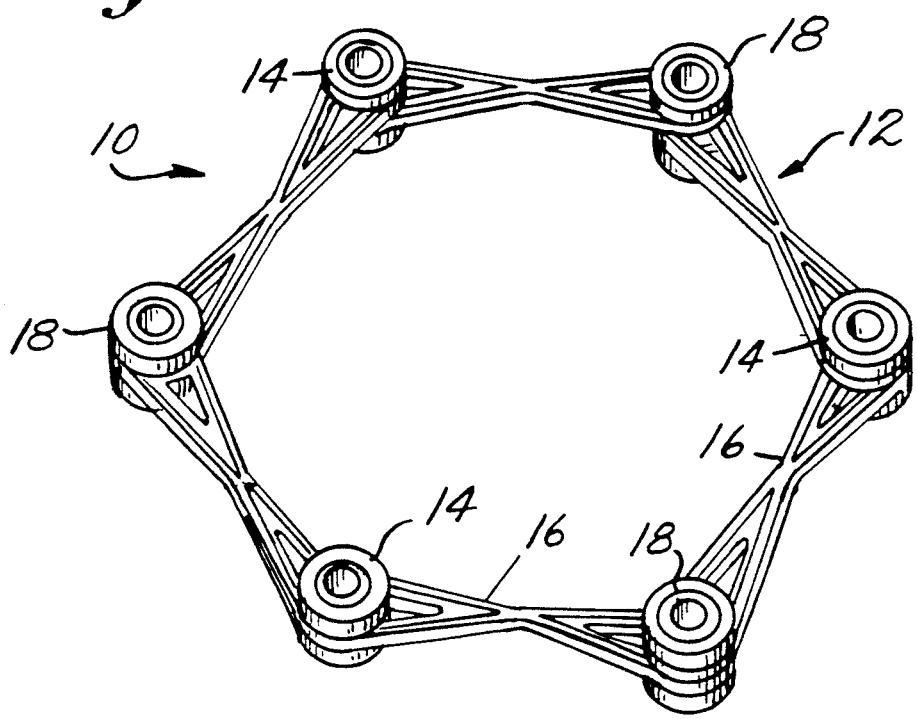
FIG. 1 is a perspective view of a flexible coupling element according to one embodiment of the present invention.

Referring now to the drawings wherein like numerals designate corresponding parts throughout the several views, there is shown in FIG. 1, a schematic illustration of a flexible coupling element 10 according to one embodiment of the present invention. As shown, the flexible coupling 10 includes a plurality of links 12 one end of each of which is looped about a drive bushing 14 which will be connected to the flange of a drive shaft with the opposite end of each link 12 looped about a driven bushing 18 which, in use, will be connected to the flange of a driven shaft. The links 12 and bushings 14 and 18 lie substantially on a circle as shown in FIG. 1. Obviously, the greater the number of links 12, the shorter will be their length and the greater will be the number of bushings 14 and 18 provided so that as the number of links and bushings increases, the more closely will the structure approach a true circle in plan view. For the majority of applications, it is believed that the array of FIG. 1 comprising six bushings and six links 12 will be sufficient.

Figure 5A:
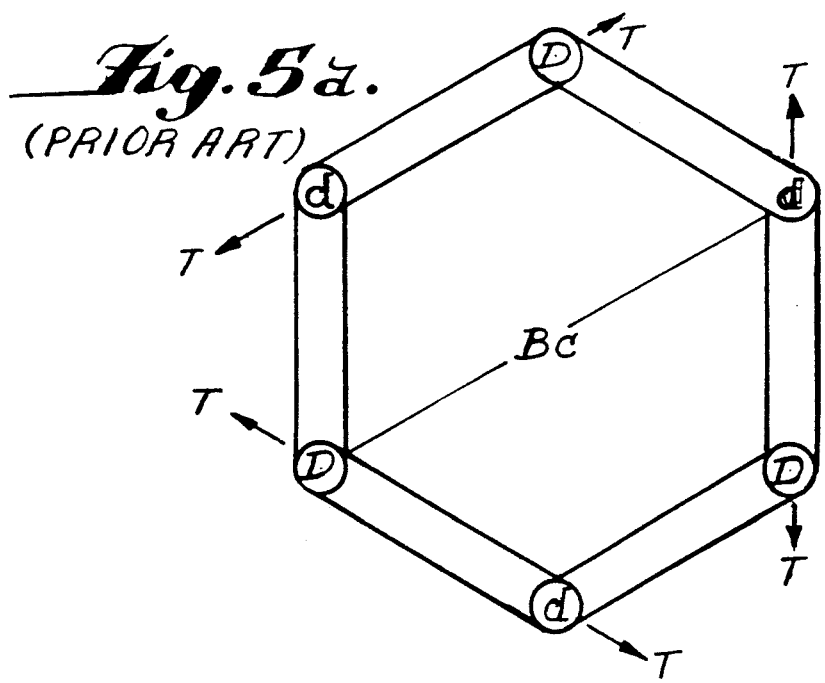
FIGS. 5a, 5b and 5c depict a prior art configuration for the flexible elements by showing a top and side view of the configuration as well as a view of a link.
Figure 5B:
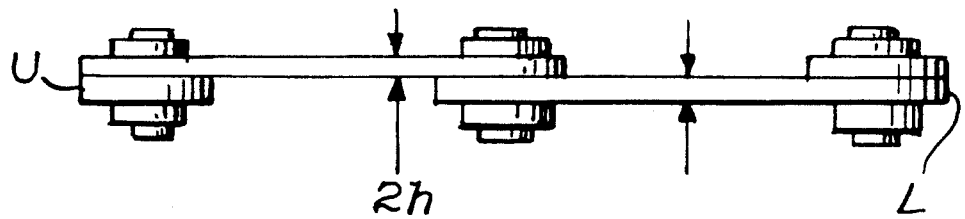
Figure 5C:
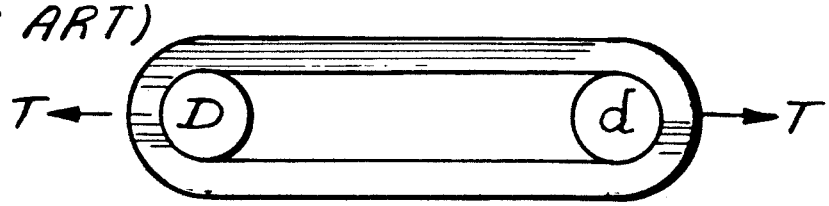
Figure 8:
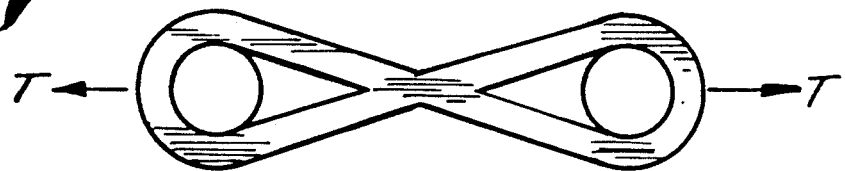
FIG. 8 illustrates a discrete component of the flexible element according to the present invention that can not withstand compressive forces.

Each link 12 is comprised of a plurality of filament windings 16. The filaments of the windings are preferably of fiber glass but may also be of Kevlar, a high strength fiber sold by the Dupont Company, carbon fibers and the like. Other such fibers will, of course, be apparent to those skilled in this art. Each winding 16 loops about the associated bushings 14 and 18 in a pattern as shown by the arrows in FIG. 4, and as described in more detailed below. Alternatively, if one does not desire the invention to be able to withstand compressive forces, one can wind the filament as shown in FIG. 8 where it is not wrapped completely around the bushings 14 and 18, therefore creating a flexible element that can only withstand tensile forces as in the prior art of FIG. 5. The loop shown in FIG. 8 is intended to be used as a discrete component of the flexible element. It is not possible to wind continuously wind the filament around the bushings 14 and 18 to form the flexible element. Rather, individual links must be utilized.

Each of the drive and driven bushings 14 and 18 is provided with enlarged radial heads at each ends 17 and 19 with a cylindrical tubular body of reduced radially extent as compared to the end head 17 and 19 to facilitate wrapping and retention of the winding 16 on each of the bushings. Each bushing will be attached to the associated flange of a drive or driven shaft in a conventional manner such as by a threaded bolt with the bushing held in place on the bolt by a nut, as is conventional. When a drive shaft is rotated, a torsional force is applied to each drive bushing 14, and is transmitted in tension through link means 12 to an adjacent driven-bushing 18. As noted, the driven-bushing 18 is adapted to receive a bolt or pin (not shown). A plurality of pins normally extend from the flange portion of a conventional driven-shaft or a coupling hub in parallel and concentric to the axis of rotation of the shaft. Driven-bushing 16 is adapted to receive one such pin or bolt. When torsional force is transmitted to driven-bushing 18, it is further transmitted to the driven pin and the driven shaft. The flexible coupling element of the present invention preferably is constructed to receive two to three drive pins and an equal number of driven pins.

Figure 2:
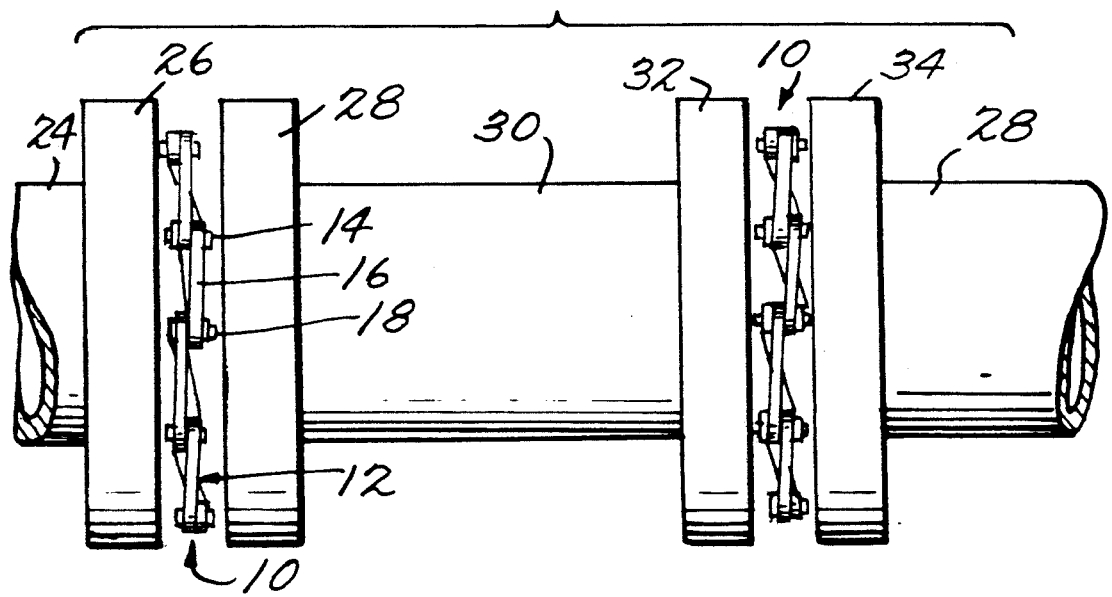
FIG. 2 is a schematic illustration in side view of a facing drive-shaft and driven-shaft interconnected by a flexible coupling incorporating two flexible coupling elements according to one embodiment of the present invention.

FIG. 2 schematically illustrates two flexible elements 10 according to the present invention disposed for assembly in a flexible coupling. One element 10 interfaces flange 26 on drive-shaft 24 and flange 28 on coupling hub 30. Another element 10 interfaces flange 32 on coupling hub 30 and flange 34 on driven-shaft 29.

A flexible coupling element according to the present invention may be practiced in either of two forms. First, a plurality of windings 16 may be separately manufactured and bushings 14 and 18 inserted through the superposed ends of windings 16 to form a link 12. The links 12 are joined to form an offset-link type flexible coupling element. Second, a plurality of alternate drive-bushings 14 and driven-bushings 18 may be concentrically arranged, and a composite fiber wound in a winding pattern to connect the bushings 14 and 18 in a disc-type flexible coupling element. In the above two forms of coupling element, the specific winding pattern affects the strength, the misalignment capacity, the dimensions, and the durability of the element.

An improved winding pattern according to the present invention is illustrated in FIG. 4. The pattern uses a cross-wind. This winding pattern compensates for compressive forces. The composite fiber is wound completely around a bushing 14 and 18. It is then run to an adjacent bushing, and is wound completely around the adjacent bushing. A return run to the initial bushing is made transverse to the first run. The winding pattern may be used to construct an offset-link type flexible element. A flexible disc-type element may also be constructed wherein all bushings are joined by a continuous composite fiber. A small variation is required in the winding pattern to connect all bushings together with the continuous fiber.

With flexible coupling elements formed by composite fibers as above, a curing process is required to solidify the wound fibers. Curing is generally achieved by exposing the fibers to a high temperature (250° to 350° F.) for a predetermined period of time.

It is also possible to perform the curing step in conjunction with curing as shown in FIGS. 3a-c. FIG. 3A depicts one link 12 of a flexible coupling element prior to the forming phase. The forming operation consists of clamping the fibers of the link between two curved surfaces of a forming fixture 22. The forming fixture compresses the fibers so that the winding means 16 taper midway between adjacent bushings 14 and 18. Misalignment related bending stresses are typically greatest at either end of link 12, and lowest at the center of a link 12. By varying the cross-sectional area of the connecting means so that it is thickest near the bushings 14 and 18 and thinnest midway between, the stress distribution can be made more uniform throughout the fiber windings 16. More uniform stress distribution results in lower stress at the extremities of the link, and reduced risk of failure. The optimal curvature of the link can be determined through a stress optimization study incorporating torque, speed of rotation, misalignment conditions, and the properties of the composite material. The forming tool 22 can be made by attaching a soft layer of heat resistant material (such as silicon rubber) to a metal base shaped with the required curvature. The link 10 is cured with the forming fixture attached by exposure to a high temperature of about 250° to 350° F. for a predetermined period of time. It is preferable to use a layer silicon rubber interposed between the metal base and the composite fibers as the silicon rubber expands during the heat treatment process to exert additional pressure on the composite fibers. This pressure helps eliminate air pockets and voids in the composite material. Such imperfections are a significant cause of failure in composite coupling elements.

Figure 6A:
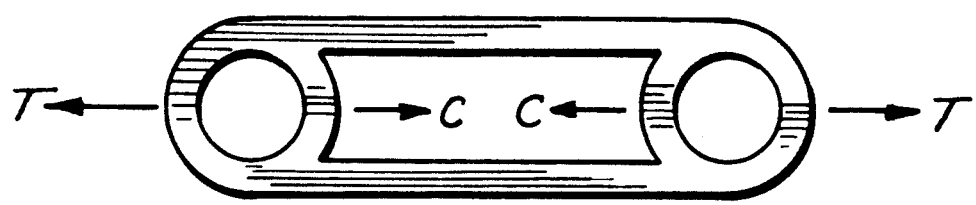
FIG. 6a and 6b illustrate a top view of a second embodiment of the present invention and the method of filament winding used to construct such links.
Figure 6B:
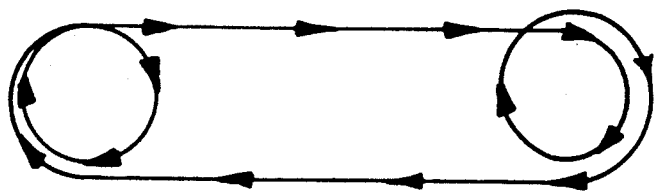
Figure 7:
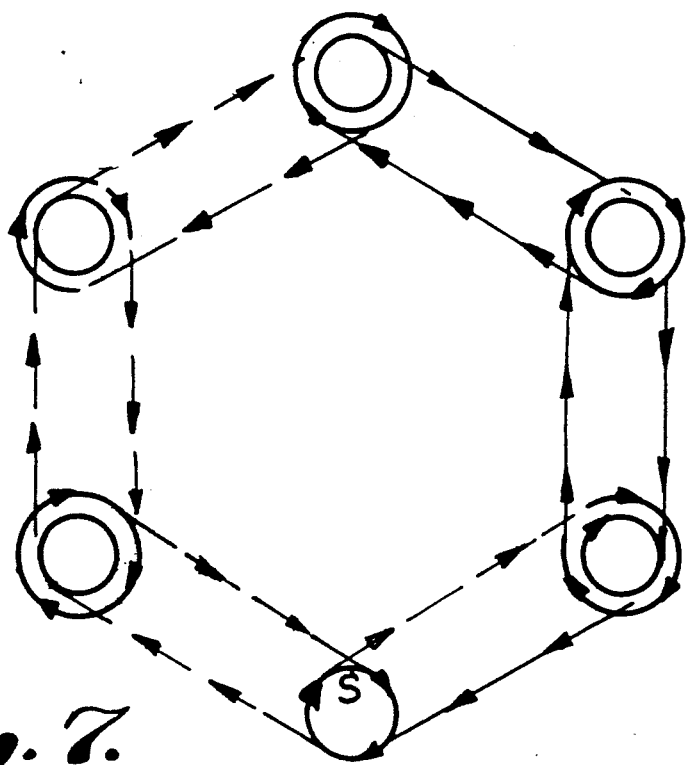
FIG. 7 is a schematic of the winding pattern for a flexible element constructed of the links shown in FIG. 6a and 6b.

A second embodiment of the present invention is shown in FIG. 6a and 6b. FIG. 6a represents a link similar to the prior art link of FIG. 5c, except this link is able to withstand compressive, C, as well as tensile forces, T. As can be seen from FIGS. 6a and 6b, the fibers used to make the link are wrapped all the way around both pins. FIG. 6b depicts the winding pattern for this link. The winding begins at the 'S' and continues as in the prior art. When the winding reaches the second pin, P2, it is wrapped therearound and then heads back to the first pin, P1, where the winding is wrapped around the pin until the winding reaches the start position. Of course, the flexible element constructed from links such as these also may be formed and cured as described above for greater flexibility. FIG. 7 depicts the winding pattern for winding the flexible element so as to form the flexible element of links as depicted in FIG. 6.

Even greater misalignment capacity can be attained in another embodiment of the present invention using several thin composite discs instead of a single thick one. Each disc is constructed as previously described with continuous composite fibers, however the fibers are wound fewer times. Multiple thinner discs constructed in this fashion are stacked to form a single disc element.

Having described the invention, it will be apparent that various other modifications may be made thereto without departing from the spirit and scope of this invention as defined in the appended claims.

What is claimed is:

1. A method for constructing links for use in a flexible coupling, said coupling adapted for interfacing two rotary flanges including a drive-flange and a driven flange, and for transmitting torque therebetween, each of said flanges having a plurality of pins extending outward along an axis of rotation, the method comprising the steps of:

arranging a drive-bushing adapted to receive a drive-flange pin, in parallel with a driven-bushing adapted to receive a driven-flange pin;

connecting said bushings by a flexible connecting means comprising a composite fiber wrapped repeatedly around at least an entire circumference of said drive-bushing and also around at least an entire circumference of said driven-bushing in a winding pattern, said winding pattern involving paired runs connecting both of said bushings with the portion of said fiber encircling said respective bushings being wrapped in contact through 360° about said respective bushing;

forming the flexible connecting means by compressing the fibers connecting said bushings so that the flexible connecting means tapers midway between said bushings;

curing the flexible connecting means at a temperature of around 250°-350° degrees fahrenheit for a predetermined period of time.

2. The method for constructing links according to claim 1, wherein the third step of compressing the connecting runs comprises clamping said connecting runs between opposing forming fixtures.

3. The method for constructing links according to claim 2, wherein the clamping surface of said forming fixtures is curved.

4. The method for constructing links according to claim 3, wherein the clamping surface of said forming fixtures is coated with a heat resistant material.

5. The method for constructing links according to claim 4, wherein the heat resistant material is silicon rubber.

* * * * *